United States Patent
Lee et al.

(10) Patent No.: US 8,478,248 B2
(45) Date of Patent: Jul. 2, 2013

(54) BIDIRECTIONAL INFORMATION SHARING SYSTEM AND METHOD USING WIRELESS DATA NETWORK

(75) Inventors: Se-Yong Lee, Seoul (KR); Ki-Won Nam, Seoul (KR); Hyun-Jong Song, Seoul (KR); Kyo-Sik Hong, Anseong-si (KR); Chun-Dong Kim, Seoul (KR); Yeon-Seok Cho, Seoul (KR)

(73) Assignees: Se-Yong Lee, Seoul (KR); TW Mobile Co., Seoul (KR)

( * ) Notice: Subject to any disclaimer, the term of this patent is extended or adjusted under 35 U.S.C. 154(b) by 0 days.

(21) Appl. No.: 13/285,613

(22) Filed: Oct. 31, 2011

(65) Prior Publication Data

US 2013/0040617 A1 Feb. 14, 2013

(30) Foreign Application Priority Data

Aug. 12, 2011 (KR) .................. 10-2011-0080635

(51) Int. Cl.
*H04W 92/00* (2009.01)
(52) U.S. Cl.
USPC .................. 455/414.1; 455/466; 455/415
(58) Field of Classification Search
USPC ............ 455/414.1–415, 422.1, 458, 466, 455/550.1, 556.1–556.2, 566, 567
See application file for complete search history.

(56) References Cited

U.S. PATENT DOCUMENTS

| | | | | |
|---|---|---|---|---|
| 2004/0056887 A1* | 3/2004 | Yi | ................................. | 345/735 |
| 2005/0233735 A1* | 10/2005 | Karaoguz et al. | ............. | 455/415 |
| 2007/0010264 A1* | 1/2007 | Sun et al. | ...................... | 455/466 |

* cited by examiner

*Primary Examiner* — Kashif Siddiqui
(74) *Attorney, Agent, or Firm* — Novick, Kim & Lee, PLLC.; Jae Youn Kim

(57) ABSTRACT

Disclosed are a bidirectional information sharing system and a method using a wireless data network that can improve convenience of use by setting notification information regarding specific days which is set to replace sharing information of an unspecified third party that places a call and output the sharing information to output the notification information regarding specified days on the screen when receiving a call of the unspecified third party and input the feelings or inquiries of a user using the mobile phone sharing information of the user to allow the called party to previously know the corresponding contents before a telephone conversation at the time of call connection, and change and set sharing information so as to officially inform only close acquaintances of a relationship status of lovers or the like rather than informing unspecified individuals, in particular, inform or introduce acquaintances of the called party of relationship status.

15 Claims, 8 Drawing Sheets

US 8,478,248 B2

BIDIRECTIONAL INFORMATION SHARING SYSTEM AND METHOD USING WIRELESS DATA NETWORK

RELATED APPLICATIONS

This application claims priority from Korean Patent Application No. 10-2011-80635, filed on Aug. 12, 2011 in the Korean Intellectual Property Office, the entire disclosure of which is incorporated herein by reference.

BACKGROUND OF THE INVENTION

1. Field of the Invention

The present invention relates to a bidirectional information sharing system and a method using a wireless data network, and more particularly, to a bidirectional information sharing system and a method using a wireless data network capable of improving convenience of use by setting notification information regarding specific days which is set to replace sharing information of an unspecified third party that places a call and output the sharing information to output the notification information regarding specified days on the screen when receiving a call from the unspecified third party and inputting the feelings or inquiries of a user using the mobile phone sharing information of the user to allow the called party to previously know the corresponding contents before a telephone conversation at the time of call connection.

2. Description of the Related Art

As known, with the recent development of information and communication technologies, a development of information providing technologies capable of providing information regarding various fields to a plurality of subscribers in real time via at least one host server using a long-distance data communication network has been actively conducted.

Based on the development of peripheral technologies such as cache memory extension technology, or the like, for more rapidly providing accurate information to subscribers and information sorting technology and information compression technology for more conveniently approaching a subscriber's taste and preference have been recently under development. Further, with the development of such technologies, development of various contents and solutions thereof has also been actively conducted.

Owing to the rapid technology development, mobile phones equipped with wireless data technologies capable of more rapidly transmitting larger-capacity data to mobile phones located at a remote place have been recently released.

Generally, when a receiver receives unwanted calls, he/she can reject the calls. However, when a telephone number of a caller is not previously registered in a mobile phone of a receiver, the receiver cannot confirm the corresponding caller and therefore, has no choice but to confirm the caller through a telephone call.

New mobile phones include a function of generating an alarm when corresponding specific days are reached by setting the specific days in the new mobile phones. However, when an alarm is ringing, it creates an illusion of being a phone call. As a result, the user immediately opens their mobile phone, which is an unnecessary behavior.

Further, even when the user previously informs a called party of his/her feelings or inquiries, the user directly talks over the phone and then, informs the called party of his/her feelings or inquiries by voice. As a result, it is difficult to directly inform the called party of the user's feeling or conditions.

Further, mobile phone related technologies do not have a unit capable of officially informing only close acquaintances of relationship status of lovers or the like rather than informing unspecified individuals, in particular, capable of informing or introducing acquaintances of the called party of relationship status.

Meanwhile, the current mobile phone related technologies do not have natural advertisements or an advertising exposure unit for idle time and a plurality of mobile phones cannot simultaneously share file information. As a result, even when transmitting specific files from any one caller's mobile phone to a called party's mobile phone for sharing files, the files may be changed through zoom-in and zoom-out of file data. However, the mobile phone of the called party cannot reflect the change in real time.

SUMMARY OF THE INVENTION

Accordingly, it is an object of the present invention to provide a bidirectional information sharing system and a method using a wireless data network that can improve convenience of use by setting notification information regarding specific days which is set to replace sharing information of an unspecified third party that places a call and output the sharing information to output the notification information regarding specified days on the screen when receiving a call of the unspecified third party and input the feelings or inquiries of a user using the mobile phone sharing information of the user to allow the called party to previously know the corresponding contents before a telephone conversation at the time of call connection, and change and set sharing information so as to officially inform only close acquaintances of a relationship status of lovers or the like rather than informing unspecified individuals, in particular, inform or introduce acquaintances of the called party of relationship status.

According to an embodiment of the present invention, there is provided a bidirectional information sharing system using a wireless data network, including: a mobile phone of a first user that transmits pre-stored first sharing information to a mobile phone of a second user at the time of call connection to the mobile phone of the second user and receives second sharing information transmitted from the mobile phone of the second user and outputs the received second sharing information on a screen; and a mobile phone of a second user that transmits pre-stored second sharing information to the mobile phone of the first user at the time of call connection to the mobile phone of the first user and receives the first sharing information transmitted from the mobile phone of the first user and outputs the received first sharing information on a screen, wherein the first and second sharing information is set by the first user or the second user or is set by replacing the first and second sharing information.

Preferably, when the mobile phones of the first and second users receive a call connection signal, the mobile phones of the first and second users automatically access a wireless Internet network to transmit the preset first and second sharing information, respectively, to the mobile phone of the called party.

Preferably, the sharing information of the called party output to the mobile phone of the first user is alarm information for specific days set by the first user and is stored in the mobile phone of the first user.

Preferably, the first and second sharing information is user's feelings, conditions, or inquiries so as to be transmitted the mobile phone of the called party.

Preferably, the sharing information is stored in the mobile phone of the user so as to change and use the sharing information of the specific person by mutual authorization.

Preferably, the first and second sharing information is output by replacing the sharing information of the non-registered called party.

Preferably, the first and second sharing information shares specific files in real time even after the call connection is performed and transmits the changed information in one direction.

Preferably, the mobile phones of the first and second users determines whether the corresponding day is a specific day to which the alarm function is previously set.

Preferably, the mobile phones of the first and second users allow the called party to determine whether there is the previously registered sharing information and determine whether there is the advertisement information pre-stored by the users if it is determined that there is no previously registered sharing information and then, output the advertisement information on the screen if it is determined that there is the advertisement information.

Preferably, a bidirectional information sharing server that stores the first and second sharing information so as to be automatically transmitted to the mobile phone of the called party and receives the signal as to whether the call connection is performed so as to perform the automatic transmission from the mobile phones of the first and second users.

Preferably, the mobile phones of the first and second users include: a key input unit that generates an authorization signal and a key signal for sharing information registration; a display unit that outputs a key operation status or the sharing information transmitted from the mobile phone of the called party on the screen; a duplexer that performs wireless communication with a base station of a mobile communication network through an antenna to separate transmitted and received signals; a wireless Internet interface that is included in the duplexer and accesses a wireless Internet server (WAP server) of a predetermined URL through the wireless Internet network in software as a demon for wireless Internet connection; a receiver that receives a voice signal or character or image information from the mobile phone of the called party or a wired telephone terminal or a mobile communication exchanger through the antenna and the duplexer; a transmitter that filters and amplifies the voice signal input from a microphone so as to be able to be transmitted; a voice processor that processes the voice signal from the other party received through the receiver and outputs the processed voice signal through a speaker and processes the voice signal of the user received from the microphone and outputs the processed voice signal to the transmitter; a data storage unit that stores the sharing information to be output on the screen and the sharing information to be transmitted to the called party; a data updating unit that determines the output state for the sharing files from the mobile phone of the called party and updates and outputs the data when being changed; a controller that manages the sharing information mutually transmitted when the mobile phones and of the first and second users talk over the phone and performs the transmission process on the sharing information, determines whether the output conditions of the sharing information are satisfied, selectively extracts the sharing information to be output on the screen according to the setting and controls the extracted sharing information so as to be output.

According to another embodiment of the present invention, there is provided a bidirectional information sharing method using a wireless data network, including: storing first sharing information to be transmitted to the mobile phone of the called party to the mobile phone of the first user at the time of the phone call; receiving a call connection request signal and the second sharing information from the mobile phone of the second user that is the called party; outputting the second sharing information on the mobile phone of the first user and transmitting the first sharing information pre-stored in the mobile phone of the first user to the mobile phone of the second user so as to be output on the screen; and transmitting and receiving voice data via the mobile phone of the called party so as to perform the phone call.

Preferably, the storing further includes setting specific days in the mobile phone of the first user so as to be output on a screen by replacing second sharing information output during the receiving.

Preferably, the storing further includes setting user's health conditions or specific inquiries in the mobile phone of the first user so as to be stored as the first sharing information.

Preferably, the storing further includes setting the second sharing information in the mobile phone of the first user under mutual authorization and setting the first sharing information in the mobile phone of the second user so as to be transmitted to the mobile phone of the called party.

As set forth above, the bidirectional information sharing system and the method using the wireless data network according to the embodiments of the present invention can set an alarm for specified days as the sharing information and output the specified days at the time of a phone call when the corresponding days are reached, thereby greatly improving the convenience of use and effectively using time. The bidirectional information sharing system and the method using the wireless data network can allow the called party to previously know the user's feeling information, conditions, or inquires at the time of call connection, thereby achieving a flexible telephone conversion. The bidirectional information sharing system and the method using the wireless data network can provide the sharing information regarding a specific person to only acquaintances having a close relationship by replacing and registering the sharing information of people such as lovers, or the like, that would like to introduce acquaintances and output a natural advertisement or share the files.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

Figure 1:
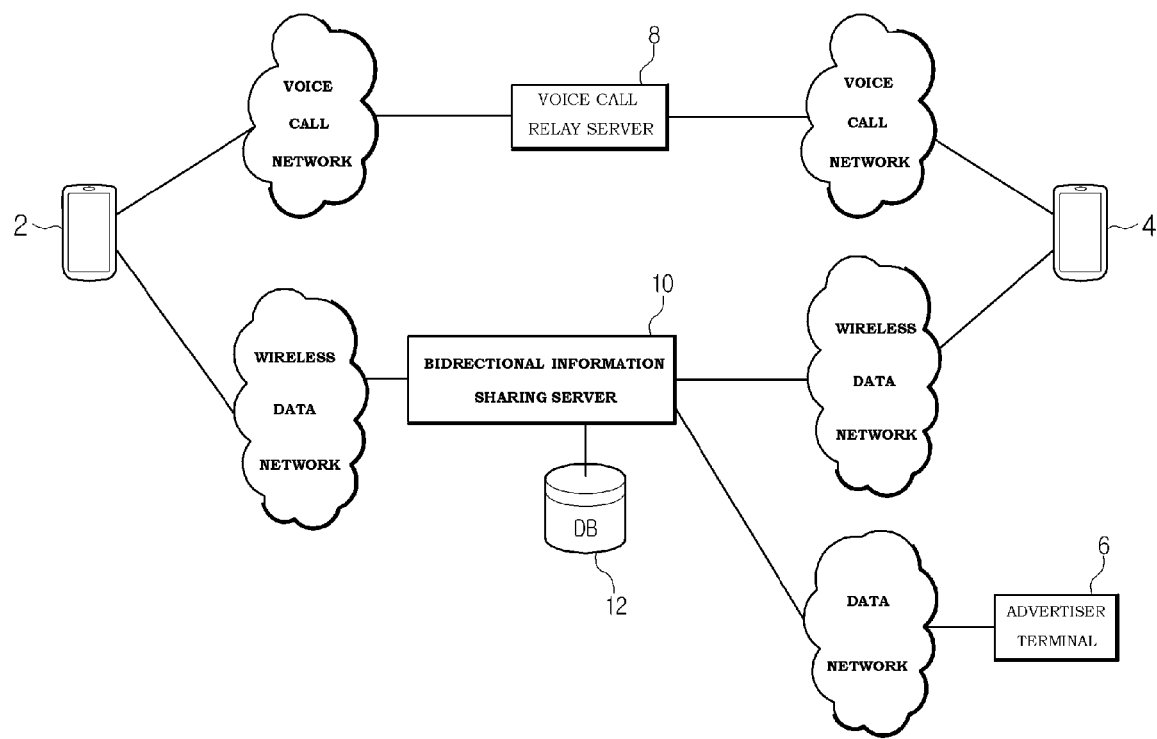
FIG. 1 is a diagram schematically showing a configuration of a bidirectional information sharing system using a wireless data network according to an embodiment of the present invention.

FIG. 1 is a diagram schematically showing a configuration of a bidirectional information sharing system using a wireless data network according to an embodiment of the present invention.

Referring to FIG. 1, the bidirectional information sharing system using the wireless data network is a system that can improve convenience of use by setting notification information regarding specific days which is set to replace sharing information of an unspecified third party that places a call and output the sharing information to output the notification information regarding specified days on the screen when receiving a call of the unspecified third party and input the feelings or inquiries of a user using the mobile phone sharing information of the user to allow the called party to previously know the corresponding contents before a telephone conversation at the time of call connection, and change and set sharing information so as to officially inform only close acquaintances of a relationship status of lovers or the like rather than informing unspecified individuals, in particular, inform or introduce acquaintances of the called party of relationship status.

In this case, sharing information is provided to the bidirectional information sharing system using the wireless data network according to the embodiment of the present invention. The sharing information is previously stored in each terminal, that is, the mobile phone 2 of the first user and the mobile phone 4 of the second user and thus, may be transmitted to mobile phones of called parties, respectively, during attempting call connection.

The sharing information may be configured of an owner's personal information of the corresponding mobile phones and thus, the receiver may receive the sharing information of the called parties and output the sharing information through the screen. Therefore, even though the caller information is not stored in the receiver's mobile phone, the receiver can know who the caller is.

That is, the bidirectional information sharing system according to the embodiment of the present invention extracts the sharing information (caller's sharing information and receiver's sharing information) of each caller and receiver during attempting the call connection from any one mobile phone to another mobile phone and transmits the extracted sharing information to the mobile phones of the called parties, respectively, such that the receiver can rapidly confirm who the corresponding caller is even when the corresponding caller's telephone number is not registered in the mobile phone of the receiver. Further, the bidirectional information sharing system according to the embodiment of the present invention may perform indirect advertisements and various information transfer functions through the sharing information of each caller and receiver.

In the embodiment of the present invention, a function of transmitting various information to a mobile phone of the called party at the time of call connection is also performed using a method of transmitting sharing information.

In more detail, the bidirectional information sharing system using the wireless data network according to the embodiment of the present invention includes: a mobile phone 2 of a first user that transmits pre-stored first sharing information to a mobile phone 4 of a second user at the time of call connection to the mobile phone 4 of the second user and receives second sharing information transmitted from the mobile phone 4 of the second user and outputs the received second sharing information on a screen; and the mobile phone 4 of a second user that transmits pre-stored second sharing information to the mobile phone 2 of the first user at the time of call connection to the mobile phone 2 of the first user and receives the first sharing information transmitted from the mobile phone 2 of the first user and outputs the received first sharing information on a screen.

In addition, the first and second sharing information may be set by the first user or the second user or may be set by replacing the first and second sharing information.

In this case, the mobile phones 2 and 4 of the first and second users transmit the first and second sharing information pre-stored in the mobile phone to a mobile phone of the called party at the time of call connection. In particular, at the step of processing a call connection before the call connection is performed, the first and second sharing information is transmitted to a mobile phone of the called party.

Therefore, the bidirectional information sharing system using the wireless data network according to the embodiment of the present invention may further include a voice call relay server 8 that performs the call connection processing. However, the voice call relay server 8 is a known configuration and the detailed description thereof will be omitted.

Meanwhile, the mobile phones 2 and 4 of the first and second users included in the bidirectional information sharing system using a wireless data network according to the embodiment of the present invention automatically access a wireless Internet network when a call connection signal is received and transmit the preset first and second sharing information, respectively, to the mobile phone of the called party. The mobile phones 2 and 4 of the first and second users may automatically access the wireless Internet network in a multi-tasking manner so as to transmit data regardless of the call connection processing and may automatically access the wireless Internet network rapidly during the time delay at the time of a call connection attempt so as to transmit data.

Meanwhile, the mobile phones 2 and 4 of the first and second users included in the bidirectional information sharing system using the wireless data network according to the embodiment of the present invention may automatically access the wireless Internet network when a call connection signal is received and transmit the preset first and second sharing information, respectively, to the mobile phone of the called party. Further, the mobile phones 2 and 4 of the first and second users may store the first and second sharing information in a bidirectional information sharing server 10 together with a telephone number and transmit a signal as to whether the call connection is performed to the corresponding bidirectional information sharing server 10 to transmit the corresponding first and second sharing information to the mobile terminal of the called party.

In this case, the sharing information of the called party output to the mobile phone 2 of the first user (or the mobile phone of the second user; however, the mobile phone of the first user is shown for convenience) may be alarm information regarding specific days (memorial ceremony, birthday, other anniversaries, or the like) set by the first user and may be stored in the mobile phone 2 of the first user.

That is, when the first user that is an owner of the mobile phone 2 of the first user designates September 1 as a specific day and then, attempts telephone conversation with the mobile phone 4 of the second user when September 1 is reached, the mobile phones 2 and 4 of the first and second users transmit the first and second sharing information pre-stored in the mobile phones at the time of the call connection to the mobile phone of the called party as described above but output the alarm information (for example, it's a husband's older brother's birthday today) on the screen of the mobile phone 2 of the first user instead of the second sharing information.

The function is not the only alarm function of specific days, but may also confirm the alarm information regarding the specific days at the time of a phone call, thereby increasing convenience of use.

In addition, the first and second sharing information may be user's feelings, conditions, or inquiries so as to be transmitted to the mobile phone of the called party.

Similarly, the first user that is an owner of the mobile phone 2 of the first user may set his/her feelings (joy, sadness), conditions (health condition or other personal matters), or inquiries (do you get a headache when eating cold foods), or the like, as the first sharing information. If the first sharing information is set as described above, the mobile phones 2 and 4 of the first and second users transmit the first and second sharing information pre-stored in the mobile phone to a mobile phone of the called party at the time of the call connection. However, the mobile phone 2 of the first user may set his/her feelings, conditions, or inquiries as the first sharing information to allow the second user that is the called party to previously confirm the feelings, the conditions, or the inquiries through the mobile phone 4 of the second user.

Therefore, the second user talks over the phone about the personal matters or the inquiries of the first user, thereby improving convenience.

Meanwhile, the bidirectional information sharing system using the wireless data network according to the embodiment of the present invention may mutually change and use the sharing information of each person in order to inform the called party of personal human connections or relationship statuses for a specific person under mutual authorization.

That is, when the first and second users have a couple relationship, if the third party (for example, referred to as a third user) attempts the call connection to the mobile phone 2 of the first user in a state in which the second sharing information (the sharing information of the first user) is registered in the mobile phone 2 of the first user under the mutual authorization and the first sharing information is registered in the mobile phone 4 of the second user, the second sharing information that is the sharing information of the second user is transmitted to the mobile phone of the third user instead of the first sharing information that is the sharing information of the first user, such that the third user can recognize the relationship status of the first and second users.

Consequently, this may publish relationship status information about persons such as a lover or the like only to close acquaintances. As a result, it is not likely to expose the relationship status information to unspecified individuals other than close acquaintances and thus, a possibility of an invasion of privacy is very low.

Meanwhile, the bidirectional information sharing system using the wireless data network according to the embodiment of the present invention has a function of outputting a natural advertisement. The first and second sharing information included in the bidirectional information sharing system using the wireless data network according to the embodiment of the present invention may be advertisement information that may be outputted by replacing the sharing information of the non-registered called party.

For example, when there is no sharing information (for example, second sharing information) of the called party, the advertisement information is registered in the mobile phone 2 of the first user so as to be automatically output and the first user may calculate charges when the advertisement is output and may receive appropriate monetary compensation.

Therefore, the mobile phone 2 of the first user is configured to output the advertisement information when conditions are satisfied by determining whether the mobile phone 2 of the first user transmits the sharing information from the mobile phone of the called party and does not receive the sharing information when the predetermined time is reached.

Meanwhile, the mobile phones 2 and 4 of the first and second users can share specific files in real time through the bidirectional information sharing system using the wireless data network according to the embodiment of the present invention. Even after the call connection is performed, the mobile phones 2 and 4 of the first and second users may share the specific files in real time and may transmit the changed information in one direction, thereby improving the convenience.

Figure 2:
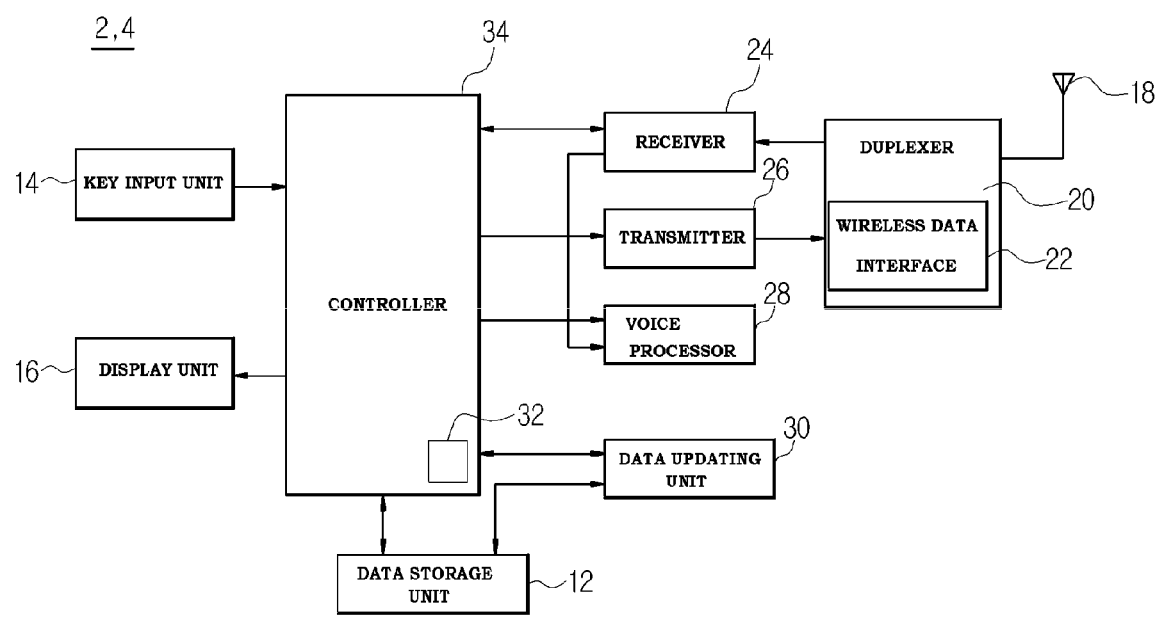
FIG. 2 is a block diagram showing a configuration of a mobile phone included in the bidirectional information sharing system using the wireless data network according to the embodiment of the present invention.

FIG. 2 is a block diagram showing a configuration of a mobile phone included in the bidirectional information sharing system using the wireless data network according to the embodiment of the present invention.

Referring to FIG. 2, the mobile phones 2 and 4 included in the bidirectional information sharing system using the wireless data network according to the embodiment of the present invention include: a key input unit 14 that generates an authorization signal and a key signal for sharing information registration; a display unit 16 that outputs a key operation status or the sharing information transmitted from the mobile phone of the called party on the screen; and a wireless Internet interface 22 that performs wireless communication with a base station of a mobile communication network through an antenna 18 to separate transmitted and received signals. The wireless Internet interface 22 is a unit that accesses a wireless Internet server (WAP server) of a predetermined URL through the wireless Internet network in software as a demon for wireless Internet connection and is mounted in a duplexer 20.

In addition, the mobile phones 2 and 4 of the first and second users include: a receiver 24 that receives a voice signal or character or image information from the mobile phone of the called party or a wired telephone terminal or a mobile communication exchanger through the antenna 18 and the duplexer 20; a transmitter 26 that filters and amplifies the voice signal input from a microphone so as to be able to be transmitted; and a voice processor 28 that processes the voice signal from the other party received through the receiver 24 and outputs the processed voice signal through a speaker and processes the voice signal of the user received from the microphone and outputs the processed voice signal to the transmitter 26.

Further, the mobile phones 2 and 4 of the first and second users include: a data storage unit 12 that stores the sharing information to be output on the screen and the sharing information to be transmitted to the called party; a data updating unit 30 that determines the output state for the sharing files from the mobile phone of the called party and updates and outputs the data when being changed; and a controller 34 that manages the sharing information mutually transmitted when the mobile phones 2 and 4 of the first and second users talk over the phone and performs the transmission process on the sharing information, determines whether the output conditions of the sharing information are satisfied, selectively extracts the sharing information to be output on the screen according to the setting and controls the extracted sharing information so as to be output.

Figure 3:
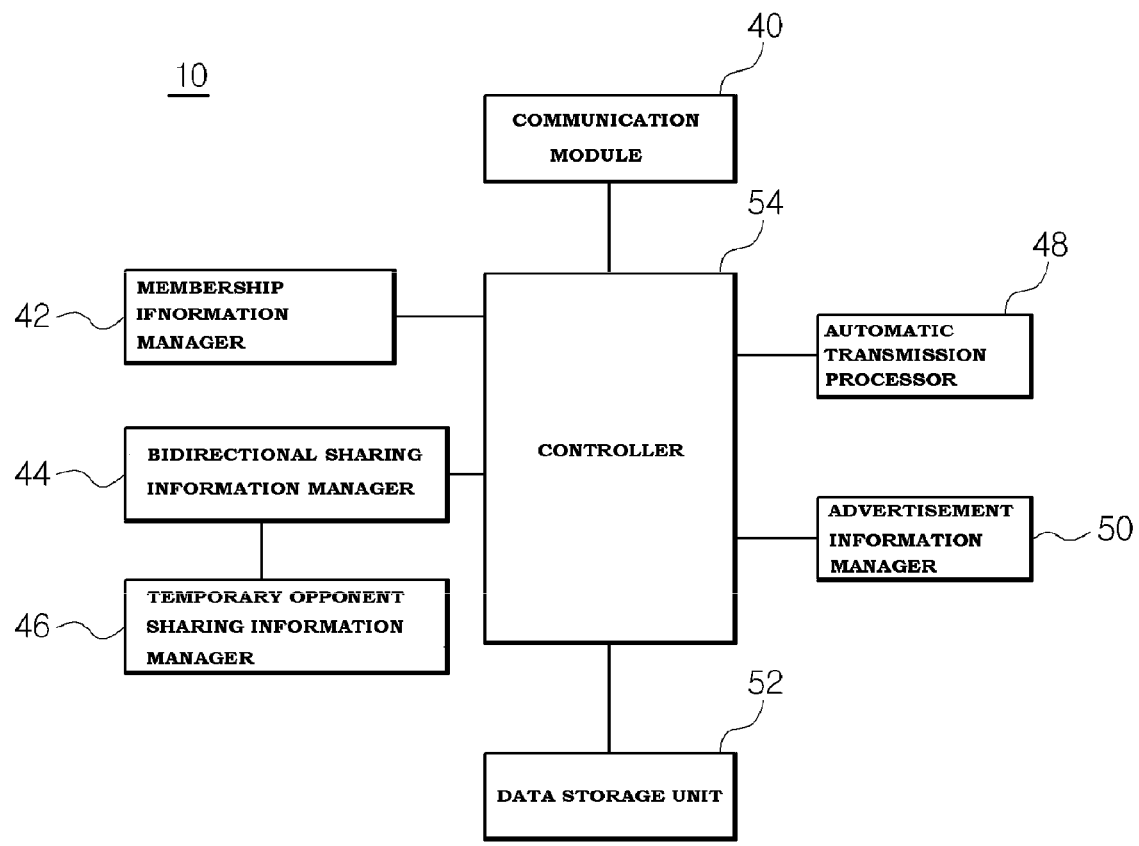
FIG. 3 is a block diagram showing a configuration of a bidirectional information sharing server included in the bidirectional information sharing system using the wireless data network according to the embodiment of the present invention.

FIG. 3 is a block diagram showing a configuration of a bidirectional information sharing server included in the bidirectional information sharing system using the wireless data network according to the embodiment of the present invention.

Referring to FIG. 3, the mobile phones 2 and 4 of the first and second users included in the bidirectional information sharing system using the wireless data network according to the embodiment of the present invention may store the first and second sharing information transmitted therebetween in the bidirectional information sharing server 10 may be transmitted by the bidirectional information sharing server 10.

The bidirectional information sharing server 10 includes: a membership information manager 42 that includes a communication module 40 communicating with the mobile phones 2 and 4 of the first and second users and manages the personal information and the telephone number information of the first and second users; a bidirectional sharing information manager 44 that manages bidirectional sharing information mutually transmitted between the mobile phones 2 and 4 of the first and second users; a temporary partner sharing information manager 46 that registers temporary partner sharing information replacing the sharing information of the called party and outputs the registered temporary partner sharing information on the screen for the predetermined time.

In addition, the bidirectional information sharing server 10 includes: an automatic transmission processor 48 that automatically transmits the sharing information of the called party managed in the bidirectional sharing information manager 44; an advertisement information manager 50 that manages the advertisement information output instead of the sharing information of the corresponding the called party if it is determined that there is no sharing information of the called party; a data storage unit 52 that stores the first and second sharing information and the advertisement information previously registered by the first user and the setting information of the sharing information set by the first and second user; and a controller 54 that performs a control to transmit the first and second sharing information by controlling each component according to the information set between the mobile phones 2 and 4 of the first and second users.

The function and action of the bidirectional information sharing system using the wireless data network according to the embodiment of the present invention having the above-mentioned configuration will be described with reference to the accompanying drawings.

Figure 4:
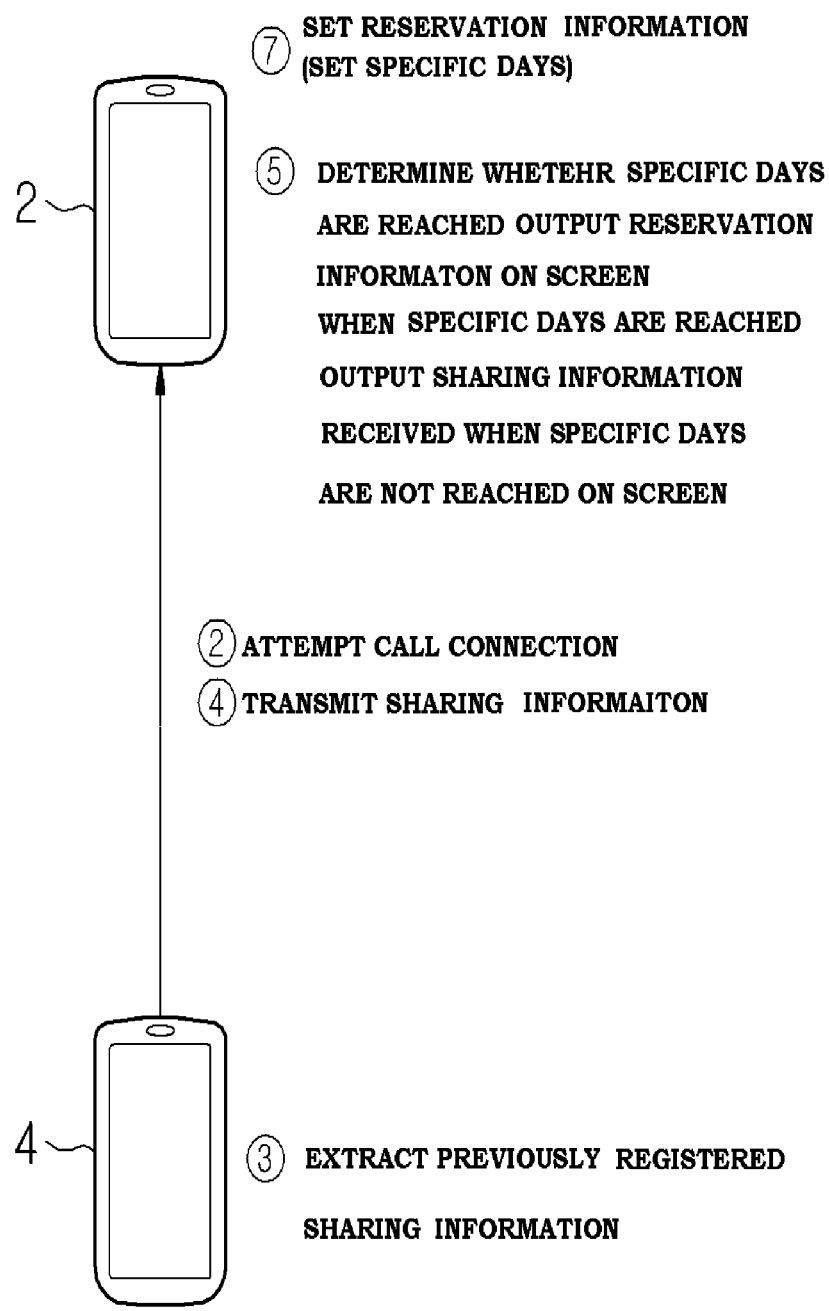
FIG. 4 is a data flow chart showing a function of reserving information regarding specific days through the bidirectional information sharing system using the wireless data network according to the embodiment of the present invention.

FIG. 4 is a data flow chart showing a function of reserving information regarding specific days through the bidirectional information sharing system using the wireless data network according to the embodiment of the present invention.

First, the bidirectional information sharing system using the wireless data network according to the embodiment of the present invention includes: a mobile phone 2 of a first user that transmits pre-stored first sharing information to a mobile phone 4 of a second user at the time of call connection to the mobile phone 4 of the second user and receives second sharing information transmitted from the mobile phone 4 of the second user and outputs the received second sharing information on a screen; and the mobile phone 4 of a second user that transmits pre-stored second sharing information to the mobile phone 2 of the first user at the time of call connection to the mobile phone 2 of the first user and receives the first sharing information transmitted from the mobile phone 2 of the first user and outputs the received first sharing information on a screen.

In this case, the mobile phones 2 and 4 of the first and second users transmit the first and second sharing information pre-stored in the mobile phone to a mobile phone of the called party at the time of call connection. In particular, at the step of processing a call connection before the call connection is performed, the first and second sharing information is transmitted to a mobile phone of the called party.

At this time, the sharing information of the called party output to the mobile phone 2 of the first user (or the mobile phone of the second user; however, the mobile phone of the first user is shown for convenience) may be alarm information regarding specific days (memorial ceremony, birthday, other anniversaries, or the like) set by the first user and may be stored in the mobile phone 2 of the first user.

That is, the owner of the mobile phone 2 of the first user designates September 1 as a specific day and is set to be output instead of the sharing information and the mobile phone 2 of the first user determines when the corresponding September 1 is reached.

When September 1 that is the corresponding specific day is reached, the mobile phones 2 and 4 of the first and second users transmits the first and second sharing information pre-stored in the mobile phone to the mobile phone of the called party at the time of the call connection as described above when attempting a call to the mobile phone 4 of the second user. However, instead of the second sharing information, the alarm information (for example, it's husband's older brother's birthday today) of the specific day that is previously registered by the first user may be output on the screen of the mobile phone 2 of the first user.

Therefore, the function is not the only alarm function of specific days, but may also confirm the alarm information regarding the specific days at the time of a phone call, thereby increasing convenience of use.

Figure 5:
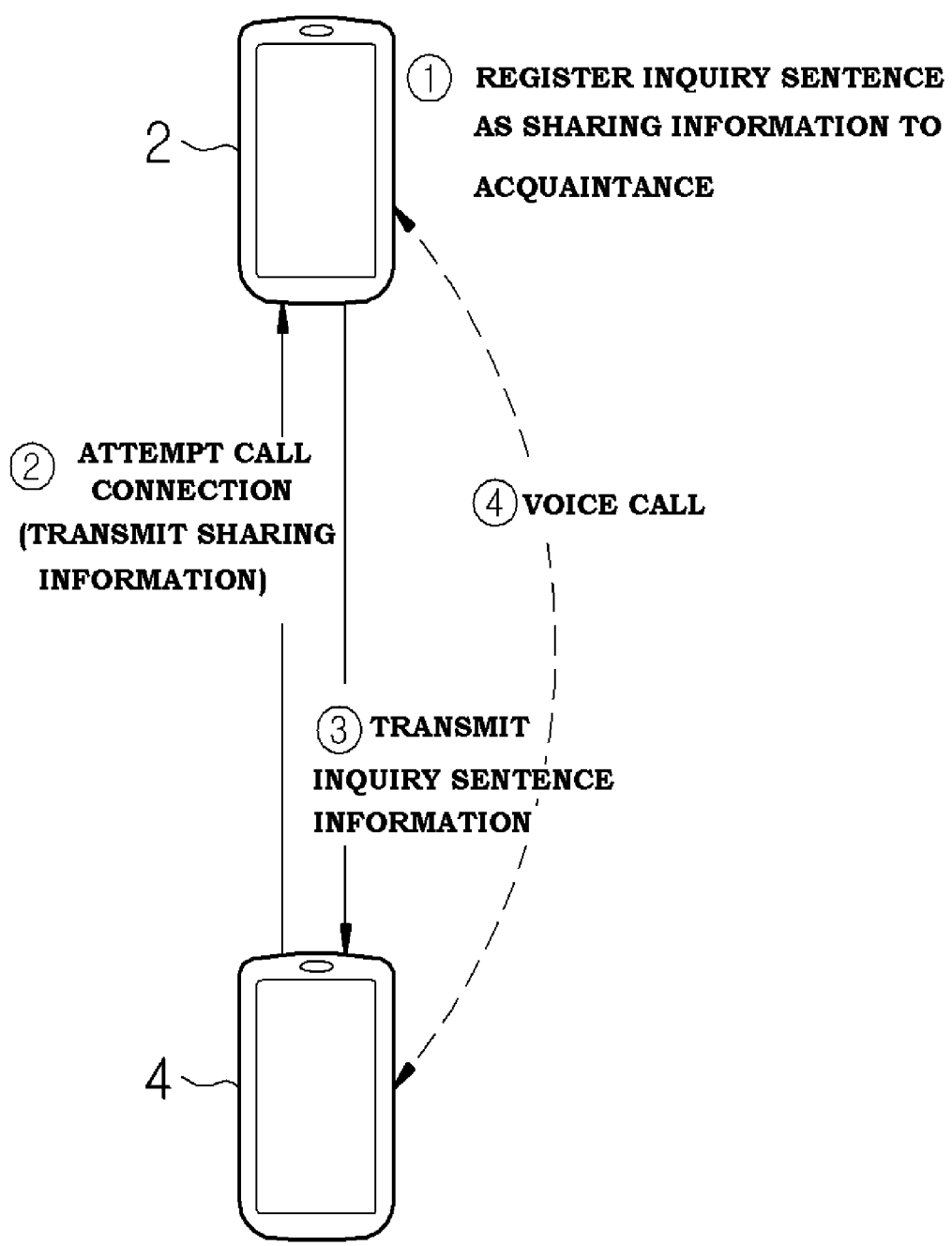
FIG. 5 is a data flow chart showing a function of informing acquaintances of information before a phone call through the bidirectional information sharing system using the wireless data network according to the embodiment of the present invention.

FIG. 5 is a data flow chart showing a function of informing acquaintances of information before a phone call through the bidirectional information sharing system using the wireless data network according to the embodiment of the present invention.

First, the bidirectional information sharing system using the wireless data network according to the embodiment of the present invention includes: a mobile phone 2 of a first user that transmits pre-stored first sharing information to a mobile phone 4 of a second user at the time of call connection to the mobile phone 4 of the second user and receives second sharing information transmitted from the mobile phone 4 of the second user and outputs the received second sharing information on a screen; and the mobile phone 4 of a second user that transmits pre-stored second sharing information to the mobile phone 2 of the first user at the time of call connection to the mobile phone 2 of the first user and receives the first sharing information transmitted from the mobile phone 2 of the first user and outputs the received first sharing information on a screen.

In this case, the mobile phones 2 and 4 of the first and second users transmit the first and second sharing information pre-stored in the mobile phone to a mobile phone of the called party at the time of call connection. In particular, at the step of processing a call connection before the call connection is performed, the first and second sharing information is transmitted to a mobile phone of the called party.

In addition, the first and second sharing information may be user's feelings, conditions, or inquiries so as to be transmitted to the mobile phone of the called party.

Similarly, the first user that is an owner of the mobile phone 2 of the first user may set his/her feelings (joy, sadness), conditions (health condition or other personal matters), or inquiries (do you get a headache when eating cold foods), or the like, as the first sharing information.

If the first sharing information is set as described above, the mobile phones 2 and 4 of the first and second users transmit the first and second sharing information pre-stored in the mobile phone to a mobile phone of the called party at the time of the call connection. However, the mobile phone 2 of the first user may set his/her feelings, conditions, or inquiries as the first sharing information to allow the second user that is the called party to previously confirm the feelings, the conditions, or the inquiries through the mobile phone 4 of the second user.

Therefore, the second user talks over the phone about the personal matters or the inquiries of the first user, thereby improving convenience.

Figure 6:
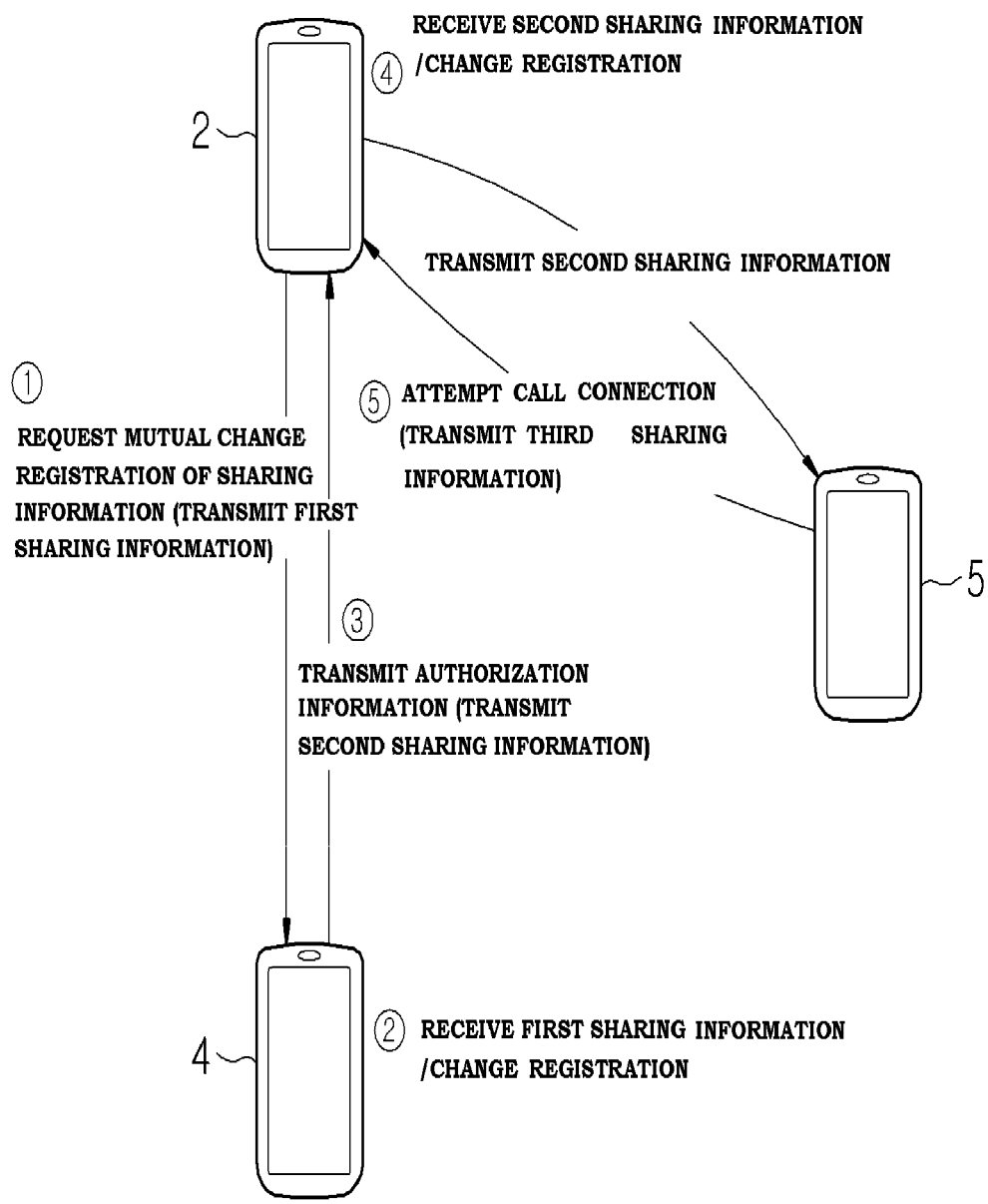
FIG. 6 is a data flow chart showing a function of changing and registering sharing information output through the bidirectional information sharing system using the wireless data network according to the embodiment of the present invention.

FIG. 6 is a data flow chart showing a function of changing and registering sharing information output through the bidirectional information sharing system using the wireless data network according to the embodiment of the present invention.

First, the bidirectional information sharing system using the wireless data network according to the embodiment of the present invention includes: a mobile phone 2 of a first user that transmits pre-stored first sharing information to a mobile phone 4 of a second user at the time of call connection to the mobile phone 4 of the second user and receives second sharing information transmitted from the mobile phone 4 of the second user and outputs the received second sharing information on a screen; and the mobile phone 4 of a second user that transmits pre-stored second sharing information to the mobile phone 2 of the first user at the time of call connection to the mobile phone 2 of the first user and receives the first sharing information transmitted from the mobile phone 2 of the first user and outputs the received first sharing information on a screen.

In this case, the mobile phones 2 and 4 of the first and second users transmit the first and second sharing information pre-stored in the mobile phone to a mobile phone of the called party at the time of call connection. In particular, at the step of processing a call connection before the call connection is performed, the first and second sharing information is transmitted to a mobile phone of the called party.

At this time, the bidirectional information sharing system using the wireless data network according to the embodiment of the present invention may mutually change and use the sharing information of each person in order to inform the called party of personal cohesion or ties for a specific person under mutual authorization.

That is, when the first and second users has a couple relationship, the second sharing information (the sharing information of the first user) is registered in the mobile phone of the first user under the mutual authorization and the first sharing information is registered in the mobile phone 4 of the second user.

In this state, when the third party (for example, referred to as a third user) attempts the call connection to the mobile phone 2 of the first user, the second sharing information that is the sharing information of the second user is transmitted to the mobile phone of the third user instead of the first sharing information that is the sharing information of the first user, such that the third user can recognize the cohesion state and tie relationship of the first and second users.

Consequently, this may publish humane tie information like a lover to only to each acquaintance. As a result, it is not likely to expose the humane tie information to unspecified individuals other than acquaintances and thus, a possibility of an invasion of privacy is very low. Therefore, this is different from a personal UCC or a personal blog that is indiscriminately exposed the unspecified third party of Internet.

Figure 7:
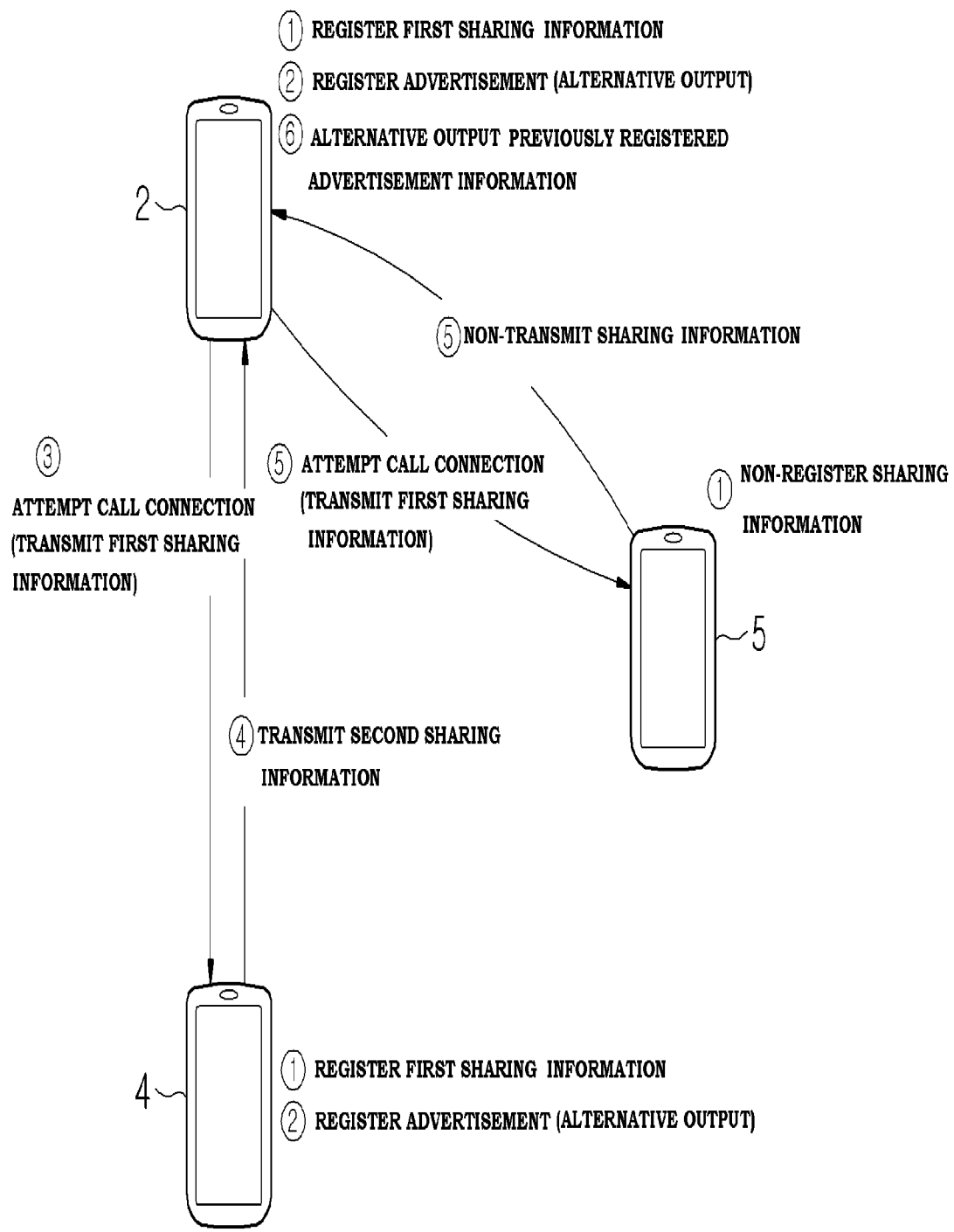
FIG. 7 is a data flow chart showing a function of outputting an advertisement at the time of conversing the sharing information with the non-registered called party through the bidirectional information sharing system using the wireless data network according to the embodiment of the present invention.

FIG. 7 is a data flow chart showing a function of outputting an advertisement at the time of conversing the sharing information with the non-registered called party through the bidirectional information sharing system using the wireless data network according to the embodiment of the present invention.

First, the bidirectional information sharing system using the wireless data network according to the embodiment of the present invention has a function of outputting a natural advertisement. The first and second sharing information included in the bidirectional information sharing system using the wireless data network according to the embodiment of the present invention may be advertisement information that may be outputted by replacing the sharing information of the non-registered called party.

For example, when there is no sharing information (for example, second sharing information) of the called party, the advertisement information is automatically registered in the mobile hone of the user and the first user may calculate charges when the advertisement is output and may receive saved money.

Therefore, the mobile phone 2 of the first user is configured to output the advertisement information when conditions are satisfied by determining whether the mobile phone 2 of the first user transmits the sharing information from the mobile phone of the called party and does not receive the sharing information when the predetermined time is reached.

In this case, an adviser terminal 6 that allows an adviser to transmit the advertisement information to the mobile phones 2 and 4 of the first and second users or the bidirectional information sharing server 10 is provided.

Figure 8:
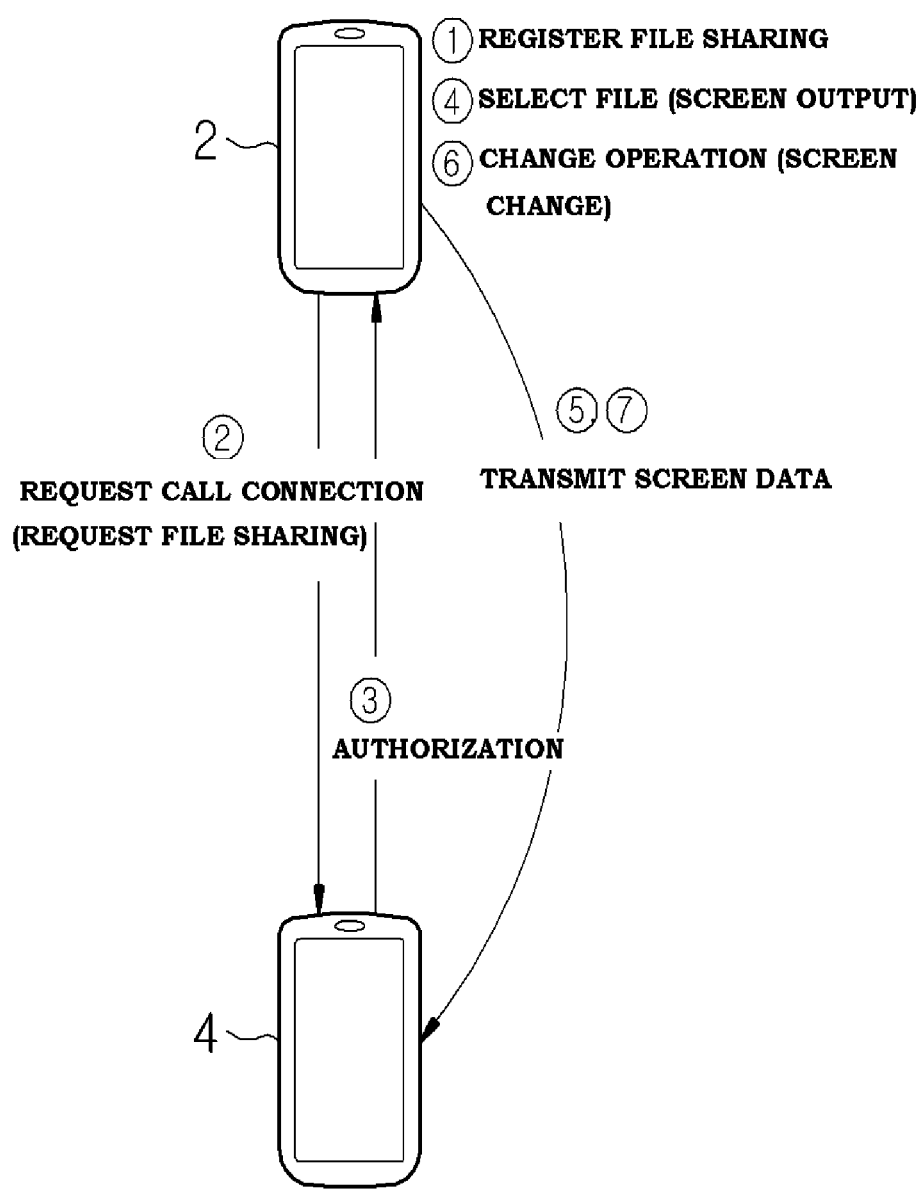
FIG. 8 is a data flow chart showing a function of sharing specific files with the conversing called party in real time through the bidirectional information sharing system using the wireless data network according to the embodiment of the present invention.

FIG. 8 is a data flow chart showing a function of sharing specific files with the conversing called party in real time through the bidirectional information sharing system using the wireless data network according to the embodiment of the present invention.

First, the mobile phones 2 and 4 of the first and second users can share specific files in real time through the bidirectional information sharing system using the wireless data network according to the embodiment of the present invention. Even after the call connection is performed, the mobile phones 2 and 4 of the first and second users may share the specific files in real time and may transmit the changed information in one direction, thereby improving the convenience.

That is, the bidirectional information sharing system using the wireless data network according to the embodiment of the present invention executes: storing first sharing information to be transmitted to the mobile phone of the called party to the mobile phone 2 of the first user at the time of the phone call; receiving a call connection request signal and the second sharing information from the mobile phone 2 of the second user that is the called party; outputting the second sharing information on the mobile phone 2 of the first user and transmitting the first sharing information pre-stored in the mobile phone 2 of the first user to the mobile phone 4 of the second user so as to be output on the screen; and transmitting and receiving voice data via the mobile phone of the called part so as to perform the phone call.

In this case, the transmitting further includes: receiving the sharing authorization signal for the specific files from the mobile phone 2 of the first user; transmitting the corresponding files to the mobile phone 4 of the second user by the mobile phone 2 of the first user; determining whether the mobile phone 2 of the first user changes data output so as to be output on the screen; extracting a change value by the mobile phone 2 of the first user to be transmitted to the mobile phone 4 of the second user; and applying the corresponding change value by the mobile phone 4 of the second user to update and process the sharing data.

This continuously performs the key operation of the changed file matters to automatically share only the change value in real time even though the transmission is not performed so as to mutually share expansion, reduction, moved state, thereby greatly improving the convenience.

While the bidirectional information sharing system using the wireless data network according to the present invention has been described with reference to the preferred embodiments, it will be understood by those skilled in the related art that various modifications and variations may be made therein without departing from the scope of the present invention as defined by the appended claims.

What is claimed is:

1. A bidirectional information sharing system using a wireless data network, the system comprising:
   a mobile phone of a first user that transmits first sharing information to a mobile phone of a second user at the time of call connection to the mobile phone of the second user and receives second sharing information transmitted from the mobile phone of the second user and outputs the received second sharing information on a screen; and
   a mobile phone of a second user that transmits the second sharing information to the mobile phone of the first user at the time of call connection to the mobile phone of the first user and receives the first sharing information transmitted from the mobile phone of the first user and outputs the received first sharing information on a screen,
   wherein the first and second sharing information is set by the first user or the second user, and
   wherein the mobile phones of the first and second users are configured to determine whether there is the first or second sharing information, to determine whether there is advertisement information pre-stored by the users if it is determined that there is no first or second sharing information, and to output the advertisement information on the screen if it is determined that there is the advertisement information.

2. The system of claim 1, wherein when the mobile phones of the first and second users receive a call connection signal, the mobile phones of the first and second users automatically access a wireless Internet network to transmit the first and second sharing information, respectively, to the mobile phone of the second user and the mobile phone of the first user.

3. The system of claim 1, wherein the first sharing information of the second user output to the mobile phone of the first user is alarm information for specific days set by the first user and is stored in the mobile phone of the first user.

4. The system of claim 1, wherein the first and second sharing information is the first and second users' feelings, conditions, or inquiries so as to be transmitted to one of the mobile phone of the first user or the mobile phone of the second user.

5. The system of claim 1, wherein the first and second sharing information is stored in the mobile phone of the first and second user, respectively, and is information of a specific person shared by mutual authorization.

6. The system of claim 1, wherein the first and second sharing information is replaced by the sharing information of a non-registered called party.

7. The system of claim 1, wherein the first and second sharing information are specific files transmitted in real time even after the call connection is performed.

8. The system of claim 1, wherein the first or second sharing information is a specific day to which an alarm function is previously set, and wherein the mobile phones of the first and second users are configured to determine whether the specific day has been approached.

9. The system of claim 1, further comprising a bidirectional information sharing server that stores the first and second sharing information so as to be automatically transmitted to the mobile phone of the first or second user and receives a signal as to whether the call connection is performed so as to perform an automatic transmission from the mobile phones of the first and second users.

10. A bidirectional information sharing system using a wireless data network, the system comprising:
    a mobile phone of a first user that transmits first sharing information to a mobile phone of a second user at the time of call connection to the mobile phone of the second user and receives second sharing information transmitted from the mobile phone of the second user and outputs the received second sharing information on a screen; and
    a mobile phone of a second user that transmits the second sharing information to the mobile phone of the first user at the time of call connection to the mobile phone of the first user and receives the first sharing information transmitted from the mobile phone of the first user and outputs the received first sharing information on a screen,
    wherein the first and second sharing information is set by the first user or the second user, and
    wherein the mobile phones of the first and second users include:
    a key input unit that generates an authorization signal and a key signal for a sharing information registration;
    a display unit that outputs a key operation status or the first or second sharing information transmitted from the mobile phone of the first or second user on the screen;
    a duplexer that performs a wireless communication with a base station of a mobile communication network through an antenna to separate transmitted and received signals;
    a wireless Internet interface that is included in the duplexer and accesses a wireless Internet server (WAP server) of a predetermined URL through a wireless Internet network in a software as a demon for a wireless Internet connection;
    a receiver that receives a voice signal or character or image information from the mobile phone of the first or second user or a wired telephone terminal or a mobile communication exchanger through the antenna and the duplexer;

a transmitter that filters and amplifies the voice signal input from a microphone and transmits the voice signal;

a voice processor that processes the voice signal from one of the first or second user received through the receiver and outputs the processed voice signal through a speaker and processes the voice signal of one of the first or second user received from the microphone and outputs the processed voice signal to the transmitter;

a data storage unit that stores the first or second sharing information to be output on the screen and the first or second sharing information to be transmitted to one of the first or second user;

a data updating unit that determines an output state for the first or second sharing information from the mobile phone of one of the first or second user and updates and outputs the first or second sharing information when being updated;

a controller that manages the first or second sharing information mutually transmitted when the first and second users talk over the phone, performs a transmission process of the first or second sharing information, determines whether output conditions of the first or second sharing information are satisfied, selectively extracts the first or second sharing information to be output on the screen according to a setting and controls the extracted first or second sharing information so as to output the first or second sharing information.

11. A bidirectional information sharing method using a wireless data network, the method comprising:

storing first sharing information to be transmitted to a mobile phone of a called party to a mobile phone of a first user at the time of a phone call;

receiving a call connection request signal and second sharing information from the mobile phone of a second user that is the called party;

outputting the second sharing information on the mobile phone of the first user and transmitting the first sharing information pre-stored in the mobile phone of the first user to the mobile phone of the second user so as to be output on a screen; and transmitting and receiving voice data via the mobile phone of the called party so as to perform the phone call, wherein the outputting further includes:

determining whether there is the second sharing information of the called party;

extracting previously registered advertisement information if it is determined that the second sharing information of the called party does not exist; and outputting the advertisement information on the screen.

12. The method of claim 11, wherein the storing further includes setting specific days in the mobile phone of the first user so as to be output on the screen by replacing the second sharing information output during the receiving.

13. The method of claim 11, wherein the storing further includes setting one of the first or second user's health conditions or specific inquiries in the mobile phone of the first user so as to be stored as the first sharing information.

14. The method of claim 11, wherein the storing further includes setting the second sharing information in the mobile phone of the first user under mutual authorization and setting the first sharing information in the mobile phone of the second user so as to be transmitted to a mobile phone of another user.

15. A bidirectional information sharing method using a wireless data network, the method comprising:

storing first sharing information to be transmitted to a mobile phone of a called party to a mobile phone of a first user at the time of a phone call;

receiving a call connection request signal and second sharing information from the mobile phone of a second user that is the called party;

outputting the second sharing information on the mobile phone of the first user and transmitting the first sharing information pre-stored in the mobile phone of the first user to the mobile phone of the second user so as to be output on a screen; and transmitting and receiving voice data via the mobile phone of the called party so as to perform the phone call, wherein the transmitting further includes:

receiving a sharing authorization signal for specific files from the mobile phone of the first user;

transmitting the specific files to the mobile phone of the second user by the mobile phone of the first user;

determining whether the mobile phone of the first user changes data output so as to be output on the screen;

extracting a change value by the mobile phone of the first user to be transmitted to the mobile phone of the second user; and applying the change value by the mobile phone of the second user to update and process the specific files.

* * * * *